(12) United States Patent
Gersbach et al.

(10) Patent No.: US 11,928,646 B2
(45) Date of Patent: Mar. 12, 2024

(54) METHOD FOR VERIFYING THE FIELD DEVICE INVENTORY ENTERED IN AN ASSET MANAGEMENT SYSTEM

(71) Applicant: Endress+Hauser Process Solutions AG, Reinach (CH)

(72) Inventors: Adrian Gersbach, Basel (CH); Michael Maneval, Schopfheim (DE)

(73) Assignee: Endress+Hauser Process Solutions AG, Reinach (CH)

( * ) Notice: Subject to any disclaimer, the term of this patent is extended or adjusted under 35 U.S.C. 154(b) by 191 days.

(21) Appl. No.: 17/628,934

(22) PCT Filed: Jun. 18, 2020

(86) PCT No.: PCT/EP2020/066987
§ 371 (c)(1),
(2) Date: Jan. 21, 2022

(87) PCT Pub. No.: WO2021/013444
PCT Pub. Date: Jan. 28, 2021

(65) Prior Publication Data
US 2022/0253795 A1    Aug. 11, 2022

(30) Foreign Application Priority Data
Jul. 22, 2019  (DE) ...................... 10 2019 119 714.7

(51) Int. Cl.
*G06Q 10/087* (2023.01)

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS

| 2018/0082916 A1 | 3/2018 | Katkar |
| 2018/0083916 A1* | 3/2018 | Xu ...................... H04L 61/5007 |

FOREIGN PATENT DOCUMENTS

| CN | 102902243 A | 1/2013 |
| CN | 103065210 A | 4/2013 |
| CN | 103621013 A | 3/2014 |

(Continued)

*Primary Examiner* — Paul Danneman
(74) *Attorney, Agent, or Firm* — Kelly J. Smith; Endress+Hauser (USA) Holding, Inc.

(57) ABSTRACT

A method for verifying field device inventory includes connecting a processing unit to a network; reading the address space of the network using the processing unit to generate a list of field devices contained in the address space; establishing communication between the processing unit and a field device contained in the list; reading out identification information of the field device using the processing unit, the identification and a characteristic parameter of the field device; carrying out a consistency check, a negative result being achieved if a field device is already entered under the serial number that has been read out; checking, if a negative result, whether a characteristic parameter of the field device corresponds with the characteristic parameter that has been read out; and outputting a notification using the processing unit that a characteristic parameter assigned to the field device deviates from the parameter that has been read out.

10 Claims, 1 Drawing Sheet

(56) References Cited

FOREIGN PATENT DOCUMENTS

| | | |
|---|---|---|
| DE | 102007062914 A1 | 6/2009 |
| DE | 102015121947 A1 | 6/2017 |
| DE | 102017109029 A1 | 10/2018 |
| DE | 102017109030 A1 | 10/2018 |
| WO | 2017029079 A1 | 2/2017 |
| WO | 2017066301 A1 | 4/2017 |

* cited by examiner

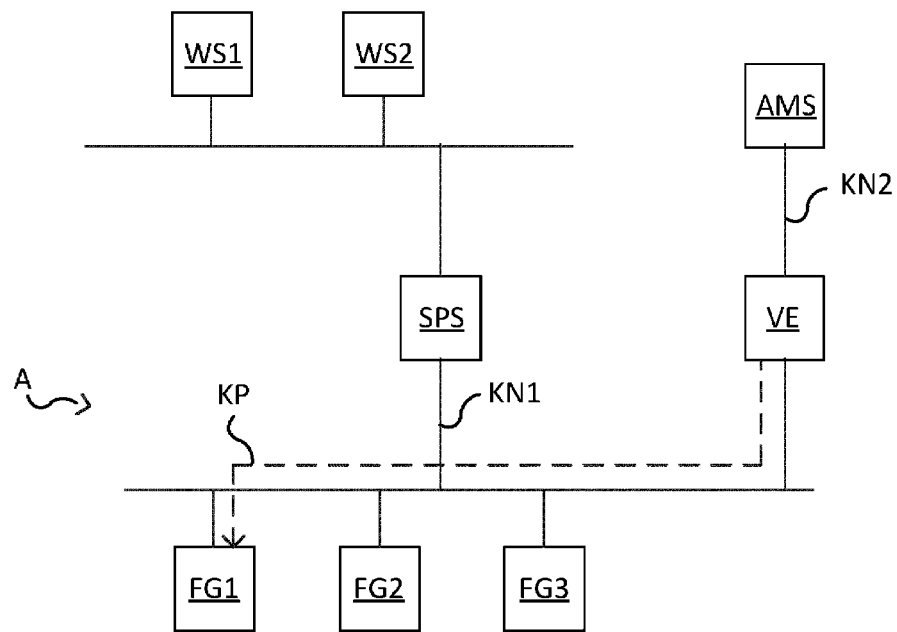

METHOD FOR VERIFYING THE FIELD DEVICE INVENTORY ENTERED IN AN ASSET MANAGEMENT SYSTEM

CROSS-REFERENCE TO RELATED APPLICATIONS

The present application is related to and claims the priority benefit of German Patent Application No. 10 2019 119 714.7, filed on Jul. 12, 2019 and International Patent Application No. PCT/EP2020/066987 filed on Jun. 18, 2020, the entire contents of which are incorporated herein by reference.

TECHNICAL FIELD

The invention relates to a method for verifying the field device inventory entered in an asset management system, wherein a plurality of field devices are integrated into a communication network.

BACKGROUND

Field devices that are used in industrial facilities are already known from the prior art. Field devices are often used in process automation engineering, as well as in manufacturing automation engineering. In principle, all devices which are process-oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuators are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A multitude of such field devices is produced and marketed by the Endress+Hauser group.

In modern industrial plants, field devices are usually connected to superordinate units via communication networks such as fieldbuses (Profibus®, Foundation® Fieldbus, HART® etc.). Usually, the superordinate units are control systems or control units, such as e.g. a SPC (Stored Program Control) or a PLC (Programmable Logic Controller). The superordinate units are used for, among other things, process control, process visualization, and process monitoring, as well as commissioning of the field devices. The measured values recorded by the field devices, especially by sensors, are transmitted via the respective bus system to a (or in some cases a plurality of) superordinate unit(s). In addition, data transmission from the superordinate unit via the bus system to the field devices is also required, especially for configuration and parameterization of field devices and for controlling actuators.

To operate the field devices, corresponding operating programs (operating tools) are necessary which either run independently on the superordinate units (Endress+Hauser FieldCare, Pactware, AMS Fisher-Rosemount, PDM Siemens) or else are also integrated into control system applications (Siemens PCS7, ABB Symphony, Emerson Delta V). It is also possible to execute the operating programs on a mobile operating device in order to operate the field devices by means of said operating device.

Gateways or plant access points are often arranged in the fieldbus network, parallel to the superordinate units. These make it possible to listen in on the telegrams exchanged on the fieldbus network and to provide their contents (for example, measured values of process variables, device status, or diagnostic information), for example via the Internet or a local network of the plant operator. The contents are especially made available to what is known as an asset management system. Such an asset management system manages the inventory of the plant operator and depicts to said plant operator the field devices used in the plant, as well as their device status and optional further device information. A (field) device detected in the asset management system especially represents an exact electronic image of the (field) device used in the field (digital twin).

A distinction between different types can be made as to how the asset list (i.e., the list of devices contained in the plant) can be detected in an asset management system:

a) The data of the devices to be acquired is taken directly from the planning phase or ordering phase.
b) Via visual or manual recording by a human being. For this purpose, the serial number or the type plate of the field device is read on-site, for example, and entered online into the asset management system.
c) Electronic acquisition from the (field) devices directly, for example via a fieldbus by means of detection at a central location, or via a (mobile) processing unit.

In each of the instances, identification information (for example, a serial number or a type plate, especially an electronically readable type plate, information regarding the device manufacturer, device type etc.) of the respective (field) device is stored in the asset management system, using which identification information the device can be uniquely identified and with which the further data or information are associated.

These identification identifications are often not present or are unclear, whereby the devices in the asset management system cannot be associated and tracked. The added value of the device for the asset management system is thus lost.

Often, the reason for insufficient association of the devices in the asset management system is ambiguously assigned identification information. For example, if different devices having the same serial number are reported for data acquisition during the scan of the fieldbus network, data that are relevant for the runtime asset management of all devices having the same identification information are associated in the asset management system with the electronic image associated with one of the serial numbers. This inconsistency renders the value of the asset management system worthless for the affected devices; in the most serious instances, incorrect conclusions regarding a device are made and incorrect actions are possibly derived.

Reasons for ambiguously assigned identification information may include, for example:
 in production, the device manufacturer has not ensured that a unique serial number has been assigned;
 the serial number, which is applied to the type plate of a device, and the electronically readable serial number of a device do not match;
 within the scope of a service action, a new firmware was flashed to the device, with which the original serial number was overwritten;

during the writing of the serial number after a firmware flash, an error was committed, for example due to a typographical error or an unreadable type plate.

SUMMARY

The invention is based on the object to present a method which makes it possible to determine inconsistencies between the field device inventory in an asset management system and the field devices actually present in the plant.

The object is achieved by a method for maintaining the field device inventory entered in an asset management system, wherein a plurality of field devices are integrated into a communication network, wherein the method comprises the following steps:
  i. connecting a processing unit to the first communication network;
  ii. reading out the address space of the communication network by means of the processing unit in order to generate a list of all field devices contained in the address space;
  iii. establishing communication between the processing unit and a field device contained in the list, via a communication path in the first communication network;
  iv. reading out identification information of the field device by means of the processing unit using the established communication, wherein the identification information includes at least a serial number of the field device and a characteristic parameter of the field device, especially its communication path;
  v. performing a consistency check in the asset management system, wherein a negative result of the consistency check is achieved if a field device is already entered in the asset management system under the serial number that has been read out;
  vi. checking, in the event of a negative result of the consistency check, whether a characteristic parameter associated with the field device in the asset management system corresponds with the characteristic parameter that has been read out; and
  vii. outputting a notification of a need for action by means of the processing unit in the event that, in the asset management system, a characteristic parameter associated with the field device deviates from the characteristic parameter that has been read out.

According to the invention, it is thus possible to ensure that only uniquely identifiable field devices are generated in the asset management system. Field devices that were not clearly detected in the asset management system can be discovered.

A communication path or network path is understood to mean a cascade of network addresses. Specifically, these are primarily the network addresses of their devices, including the field device itself, which must be addressed so that the processing unit can establish communication with the field device. If the processing unit is located at the same level or hierarchy as the field device, the communication path thus consists of the network address of the field device. If one or more levels, for example separated by gateways, are located between the processing unit and the field device, the communication path additionally comprises the network addresses of the gateways. The asset management system requires the communication path as a significant distinguishing feature of the field devices. For this purpose, the network address is insufficient because the network addresses can repeat in the different levels of the first communication network.

Field devices that are mentioned in connection with the method according to the invention have already been defined and listed by way of example in the preamble of the description.

According to an advantageous development of the method according to the invention, it is provided that the field device is newly entered into the asset management system by the processing unit in the event that no field device with the network parameter that has been read out has been entered in the asset management system. In this way, the convenience for the operator is increased on the one hand; on the other hand, further errors are directly avoided via the automatic application or entry.

An advantageous embodiment of the method according to the invention provides that, in the course of the readout, at least one further identification information item is read out from the field device, especially a tag, wherein the notification of a need for action is output only if, in the asset management system, a network parameter associated with the field device corresponds to the network parameter that has been read out and, in the asset management system, a further identification information item associated with the field device corresponds to the further identification information item that has been read out. For example, it can be provided that a field device also has, in addition to the serial number which is located on a type plate on the device, an internal serial number, and the two can also be systematically different from one another. Typically, both serial numbers are indicated in the asset management system with respect to the field device. Should one of the two serial numbers thus already be entered in the asset management system after the querying of the field device according to the invention, but not the other one, the field device would be distinguishable as before.

Any information about a field device which remains identical or unique over the life cycle of a field device can be used as identification information. Advantageously, it can be provided that the processing unit or the asset management system itself subsequently assigns uniform new serial numbers for the field devices which remain unique over the lifetime of the field devices. After they are generated and assigned, they can be applied to the type plate of the field devices and be added to an electronic readability. This eliminates the disadvantage that the serial numbers of the field devices, which are electronically stored and which are located on the respective type plate, can often deviate from one another over the life cycle.

According to an advantageous development of the method according to the invention, it is provided that the processing unit outputs an action instruction, wherein the action instruction comprises at least one action which, when performed, resolves the need for action. The method according to the invention thus not only allows the operator to detect inconsistencies—rather, the operator receives direct assistance for correcting the problem. The action instruction is displayed, especially on a display of the processing unit, or is output via an acoustic reproduction means of the processing unit. Alternatively, the processing unit transmits the action instruction to another device which outputs it to the operator.

An advantageous embodiment of the method according to the invention provides that the action instruction comprises at least one of the following steps:
  modifying the serial number in the field device;

modifying additional identification information in the field device;

adding additional identification information in the asset management system.

The serial number of a field device is often available in a plurality of places—physically printed on the type plate and electronically entered into a storage of the field device. The two should be identical. In addition to this are hardware and electronic components of the field device, which often also have their own serial numbers. These could be used as further identification information. Inconsistencies can be resolved, for example, by a firmware flash or by an exchange of the corresponding hardware and electronic components.

According to an advantageous embodiment of the method according to the invention, it is provided that a PC, a laptop, or a mobile terminal is used as a processing unit.

Alternatively, any other processing unit can be used which allows it to be connected to the first communication network and which has an audio reproduction capability for action instructions, for example a display unit, an audio reproduction means, or an interface for additional devices. A mobile terminal is understood to mean a smartphone or a tablet (PC), for example.

According to a first variant of the method according to the invention, it is provided that an Ethernet-based network is used as the communication network.

According to a second variant of the method according to the invention, it is provided that an automation engineering fieldbus is used as a network.

According to an advantageous embodiment of the method according to the invention, it is provided that the processing unit contacts the asset management system via a second communication network, especially via internet.

According to a preferred embodiment of the method according to the invention, it is provided that the method is implemented during a reinstallation of a field device or an exchange of one of the field devices. Typically, this use case is that in which, increasingly, errors occur or inconsistencies are generated. By applying the method according to the invention, this is thus prevented from the outset.

BRIEF DESCRIPTION OF THE DRAWING

The invention is explained in greater detail with reference to the following Figure. Illustrated is:

FIG. 1 shows an exemplary embodiment of the method according to the present disclosure.

DETAILED DESCRIPTION

A system A of automation technology is shown here. A plurality of computer units WS1, WS2 in the form of workstation PCs at the management level of system A is connected to a data bus DB. These computer units serve as superordinate units (control system or control unit), inter alia for process visualization, process monitoring, and for engineering, such as for operating and monitoring field devices. The data bus DB operates, for example, according to the Profibus DP standard or according to the HSE (High Speed Ethernet) standard of the Foundation Fieldbus. The management level of system A is connected to a first communication network KN1, here a fieldbus network, via a control unit SPS which is designed especially as a programmable logic controller. The first communication network KN1 comprises a plurality of field devices FG1, FG2, FG3 which are connected to one another. The field devices FG1, FG2, FG3 can be sensors or actuators. The fieldbus operates according to one of the known fieldbus standards, such as Profibus, Foundation Fieldbus, or HART. Instead of the fieldbus, it may be any wireless or wired first communication network FB.

A processing unit VE is connected to the first communication network KN1 in parallel with the control unit SPS. This is a gateway, for example. The processing unit VE is connected by means of the Internet to an asset management system AMS of the system. The inventory of system A is depicted In the asset management system AMS. Virtual images of the field devices FG1, FG2 are especially provided. The virtual images contain identification properties of the field devices FG1, FG2, especially their serial number and/or their tag; characteristic parameters of the field devices, especially network properties such as their network address; and device status of the individual field devices, especially conforming to NAMUR [User Association of Automation Technology in Process Industries]. The processing unit VE is designed to listen in on information regarding the device status of the field devices FG1, FG2 from the first communication network KN1 and to provide said information to the asset management system AMS so that this is always up to date. The field device FG3 is not entered in the asset management system AMS.

Due to the problem determined in the preamble of the description, a regular verification of the consistency of the field devices FG1, FG2 entered in the asset management system AMS with the field devices FG1, FG2, FG3 actually located in the system A is necessary so that the device statuses indicated in the asset management system AMS also actually correspond to the provided field device FG1, FG2, FG3.

For this purpose, the processing unit VE scans the address space of the first communication network. The dimensions of the address space are either stored in the processing unit VE or can be specified by an operator. If a participant logs in under the network address being addressed, the participant is recorded in a list. After the scan of the address space, the processing unit contains what is known as a live list, which contains all active field devices FG1, FG2, FG3 which are located in the scanned address space in the first communication network.

The field devices listed in the asset management system AMS which are located in the address space and have responded are marked. For consistency checking, after the operator has been selected in the asset management system AMS, the processing unit VE establishes a communication via the corresponding communication path to the first field device FG1. The processing unit then queries identification information of the field device FG1, in this instance its serial number, together with a characteristic parameter of the field device FG1, in this instance its network address.

In the next step, a check is made as to whether the serial number of the field device FG1 has respectively already been entered in the asset management system AMS. In the present example, the serial numbers are present and coincide with that of the selected field device FG1. It is subsequently checked whether the network address of the field devices FG1, FG2 that has been read out respectively corresponds to the network address entered in the asset management system AMS. This is so for the field devices FG1, FG2. The images of the field devices FG1 in the asset management system AMS are therefore consistent with the field devices FG1, FG2 located in the system A.

The process is repeated for the field device FG3. Although its serial number has been correctly entered in the asset management system AMS, the network address does not match. A notification of a need for action is thereupon transmitted to the operator. The processing unit VE transmits this directly to the asset management system AMS together with an action instruction as to how to correct the problem.

In the present instance, there is a second field device which has an identical serial number. This is located in an additional, different fieldbus segment. The action instruction includes the instruction to the operator to compare the serial number engraved in the type plate in the field device FG2 to the serial number electronically stored in the field device FG2. In the present instance, these do not match. The serial number stored in the field device FG2 would need to be a different one. In the action instruction, it is therefore recommended that the operator flash the firmware of the field device FG2 and upload the correct serial number in order to resolve the problem.

Because the true serial number of the field device FG3 has not been entered in the asset management system AMS, it is automatically entered after a new scan.

LIST OF REFERENCE SYMBOLS

A System
AMS Asset management system
FG1, FG2, FG3 Field devices
KN1 First communication network
KN2 Second communication network
KP Communication path
SPS Control unit
VE Processing unit
WS1, WS2 Workstation PCs

The invention claimed is:

1. A method for verifying the field device inventory entered in an asset management system, wherein a plurality of field devices is integrated into a first communication network, comprising:
    connecting a processing unit to the first communication network;
    reading out the address space of the first communication network using the processing unit in order to generate a list of all field devices contained in the address space;
    establishing communication between the processing unit and a field device contained in the list, via a communication path in the first communication network;
    reading out identification information of the field device using the processing unit using the established communication, wherein the identification information includes at least a serial number of the field device and a characteristic parameter of the field device;
    performing a consistency check in the asset management system, wherein a negative result of the consistency check is achieved if, in the asset management system, a field device has already been entered under the serial number that has been read out;
    checking, in the event of a negative result of the consistency check, whether a characteristic parameter associated with the field device in the asset management system corresponds with the characteristic parameter that has been read out; and
    outputting a notification of a need for action by means of the processing unit in the event that, in the asset management system, a characteristic parameter associated with the field device deviates from the characteristic parameter that has been read out.

2. The method according to claim 1, wherein the field device is newly entered into the asset management system by the processing unit in the event that no field device with the characteristic parameter that has been read out has been entered into the asset management system.

3. The method according to claim 1, wherein, in the course of the readout, at least one further identification information item is read out from the field device; wherein the notification of a need for action is output only if, in the asset management system, a network parameter associated with the field device corresponds to the network parameter that has been read out, and in the asset management system a further identification information item associated with the field device corresponds to the further identification information item that has been read out.

4. The method according to claim 1, wherein the processing unit outputs an action instruction, wherein the action instruction comprises at least one action which, when being implemented, resolves the need for action.

5. The method according to claim 4, wherein the action instruction comprises at least one of the following steps:
    modifying the serial number in the field device;
    modifying further identification information in the field device;
    modifying further identification information in the asset management system.

6. The method according to claim 1, wherein a PC, a laptop, a gateway or a plant access point, a mobile terminal, or an operating unit of one of the field devices used as processing unit.

7. The method according to claim 1, wherein a wired network is used as a first communication network.

8. The method according to claim 1, wherein a wireless network is used as a first communication network.

9. The method according to claim 1, wherein the processing unit contacts the asset management system via a second communication network.

10. The method according to claim 1, wherein the method is implemented during a reinstallation of a field device or an exchange of one of the field devices, or during an exchange of an electronic component of one of the field devices.

* * * * *